US005798707A

United States Patent [19]

Camire

[11] Patent Number: 5,798,707

[45] Date of Patent: Aug. 25, 1998

[54] PAGER OPERATED CONTROL UNIT

[75] Inventor: Arthur J. Camire, Calumet City, Ill.

[73] Assignee: New Product Development, Inc., Orland Park, Ill.

[21] Appl. No.: 571,024

[22] Filed: Dec. 12, 1995

Related U.S. Application Data

[63] Continuation of Ser. No. 213,598, Mar. 16, 1994, abandoned.

[51] Int. Cl.$^6$ ........................ H04Q 1/00

[52] U.S. Cl. ........................ 340/825.44; 340/825.72; 340/635; 379/102

[58] Field of Search ........................ 340/825.44, 825.69, 340/825.72, 825.37, 635, 636; 379/102

[56] References Cited

U.S. PATENT DOCUMENTS 4,962,522 10/1990 Marian ........................ 340/825.44
5,061,921 10/1991 Lesko et al. ........................ 340/825.44
5,128,987 7/1992 McDonough ........................ 379/102
5,233,646 8/1993 Kuromi ........................ 379/102
5,254,908 10/1993 Alt et al. ........................ 340/825.44

*Primary Examiner*—Brian Zimmerman
*Attorney, Agent, or Firm*—Varnum, Riddering, Schmidt & Howlett LLP

[57] ABSTRACT

A pager operated control unit has input terminals of the control circuit are connected to the battery terminals of the pager and power is supplied to the pager receiver from the control circuit. Pager generated pulses are detected by the detection of changes in current drawn by the pager receiver. The control unit includes a pair of capacitors which are alternately charged under the control of a flip-flop in response to bursts of pulses generated by a pager receiver. An output relay is operated to one state when the charges on the two capacitors substantially equal, indicating the receipt of a burst of pulses of equal duration, and operated to another state when the capacitors have unequal charges, indicating the receipt of a burst of pulses of unequal duration.

6 Claims, 1 Drawing Sheet

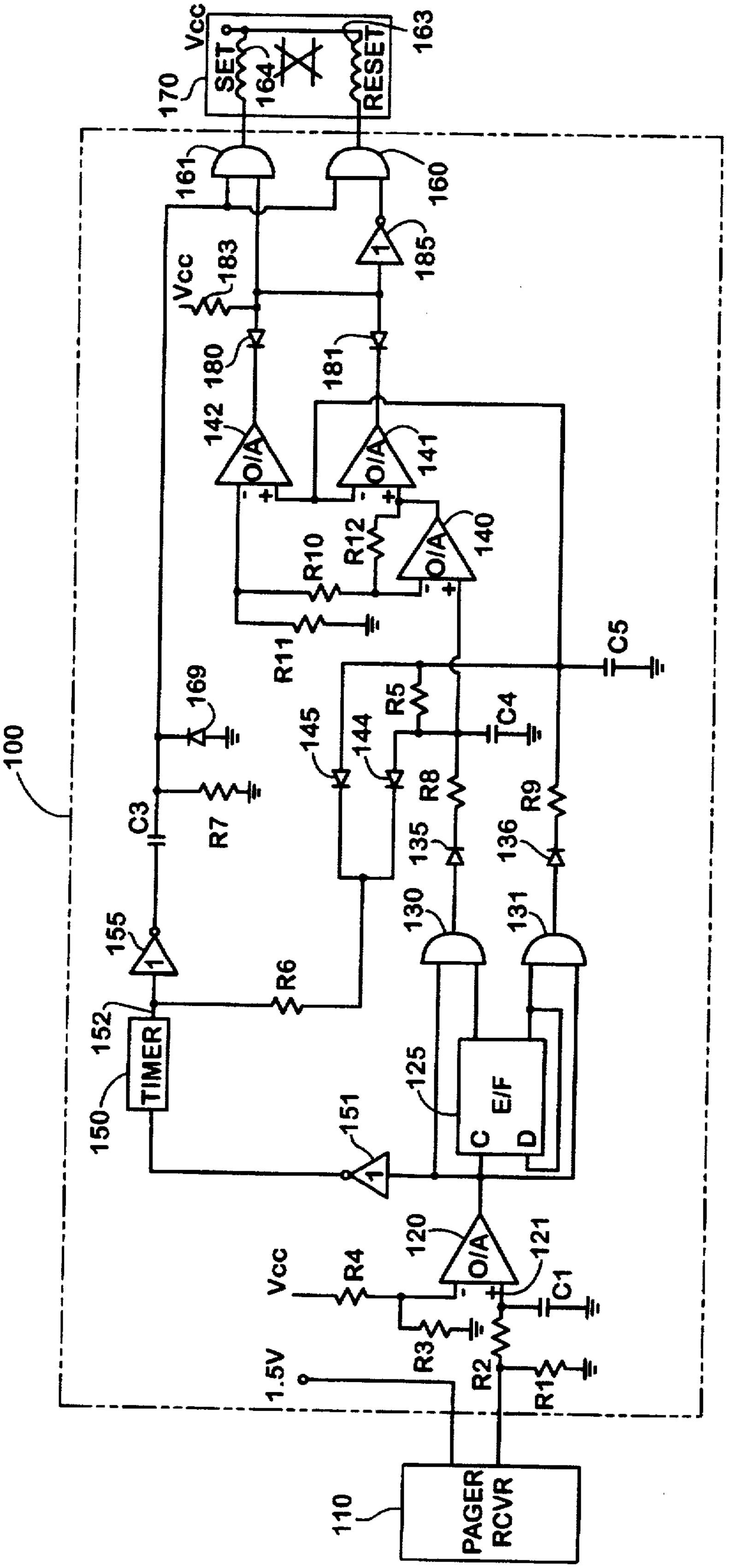
Vcc
SET
RESET
163
164
170
161
160
183
185
180
181
142
141
140
R10
R12
R11
C5
169
C4
R5
100
145
144
C3
R7
R8
R9
135
136
130
131
155
R6
152
TIMER
150
125
E/F
C
D
151
120
121
R4
C1
R3
R2
R1
1.5V
O/A
110
PAGER
RCVR

PAGER OPERATED CONTROL UNIT

This is a continuation of application Ser. No. 08/213,598, filed Mar. 16, 1994 now abandoned.

BACKGROUND OF THE INVENTION

1. Field of the Invention

The invention relates to the remote control of devices by means of pager receivers and more particularly to control circuits responsive to pager receivers to selectively operate a switch or similar a device responsive to electrical signals.

2. Background Art

Typically, paging systems are used to alert a party, via a pager receiver, to make a telephone call. The pager receiver, also referred to simply as a pager, is typically a small, battery-operated device carried by the user. To activate the receiver in a typical pager system, a predefined telephone number is dialed and the number of the calling party is recorded. The system transmits an alerting signal to the pager receiver and, in some, more sophisticated systems, also transmits the telephone number of the calling party which is displayed on the pager. If the telephone number is not displayed, the receiving party must call a prearranged number to obtain the calling party's number. In many pager systems the pager receiver will generate a first signal, which may for example be a burst of tones of approximately the same duration, when a first telephone number of the pager system is dialed and produce a second signal, for example a burst of pulses in which a short duration pulse is followed by a long duration pulse, when a second telephone number of the pager system is dialed. The differences in the signals generated by the pager may be used to define separate actions to be taken by the receiving party.

In prior art arrangements output signals from the pager receiver, generated in response to different input signals to the pager system, have been used to activate and deactivate certain operations. In one prior art arrangement disclosed in U.S. Pat. No. 4,962,522, issued Oct. 9, 1990, the signal received from the pager is a multi-digit signal used to define a variety of messages for the control of a sprinkling system. In that arrangement, a modified paging receiver or equivalent circuitry is used to interface with other electrical equipment. U.S. Pat. No. 5,061,921 issued Oct. 29, 1991 discloses an arrangement wherein the multi-digit display circuitry of the pager is connected to a control circuit. The control circuit generates a variety of output signals controlling various displays on a message display sign.

A drawback of the prior art arrangements is that modification of the pager receiver is required in order to connect to a receiving device. Furthermore, a wide variety of pager receivers are available in the marketplace, all of approximately the same physical size but generally with different circuit and physical configurations so that in order to use the pager receiver to remotely activate devices, a customized interface has to be provided.

SUMMARY OF THE INVENTION

In accordance with the principles of this invention, these and other problems of the prior art are overcome by means of a universal control interface which connects directly to at least one of the battery terminals of the pager receiver. Advantageously, the interface circuit may be battery operated or may be connected to a standard electrical supply thereby avoiding the need for a replacement of batteries.

In a particular embodiment of the invention, a pager operated control circuit comprises a pair of input terminals connected to battery terminals of a pager receiver which generates burst of pulses of a first type and of a second type. The control circuit supplies the operating power to the receiver and has a detector circuit responsive to changes in the current flow in the pager receiver. The detector circuit generates a first output signal when a burst of pulses of the first type are generated by the pager receiver and a second output signal when a burst pulses of the second type are generated. A two state output device is responsive to the detector output signals to selectively assume first and second output states.

Advantageously, the two state output device may be used to perform a number of functions such as the remote setting of thermostats or the starting and stopping of operations of any number of devices or systems.

In accordance with one aspect of the invention, the detector circuit comprises an integrating circuit which stores charge or other indication of detected pulses.

In one particular embodiment, first and second capacitors are used to store charge indicative of detected pulses. A charge control circuit alternately charges the first and second capacitors in response to sequentially received pulses of a burst of pulses. The output circuitry is responsive to the electrical charge on the capacitors to generate an output signal for operating the two state device. The control circuit comprises an input circuit which detects the difference between the current normally drawn by a pager receiver in the ON, but inactive, state and the state in which pulses are generated. The capacitors are charged only during the periods of time that pulses are generated.

In accordance with another aspect of the invention, the charge control circuit comprises a flip flop and gating circuits connected to the outputs of the flip flop and the capacitors to alternately charge the capacitors.

In one embodiment of the invention, the control unit comprises comparator circuitry, connected to the capacitors, to selectively generate output signals for operating the two state output device.

In accordance with a further aspect of the invention, the comparator circuitry includes circuitry generating threshold signals above and below the voltage level corresponding to the charge of one of the capacitors. The threshold levels are used to determine whether the charge on one of the capacitors is substantially equal to that on the other, indicating that the pulses of a recently received burst of pulses are all of substantially the same duration. Advantageously, the threshold signals define a range such that whenever the charges on the two capacitors are within a selected range of each other the circuit generates an output signal indicating that the capacitors have substantially the same charge, i.e. that the pulses of the received burst of pulses were all of the same duration. This allows for a margin of error in the length of the pulses as well as in the circuit components.

BRIEF DESCRIPTION OF THE DRAWING

An illustrative embodiment of the invention is described below with reference to the drawing which is a circuit diagram representation of a pager operated control circuit embodying the principles of the invention.

DETAILED DESCRIPTION

Shown in the drawing is a pager receiver 110 and a pager operated control circuit 100. The control circuit 100 is connected to a power source (not shown in the drawing) which may be a standard battery for stand alone operation or derived from a standard power distribution network. A 1.5 volt supply is connected from the control circuit 100 to the positive battery input terminal of the pager receiver 110. The negative terminal of the receiver 110 is connected to ground via a resistor R1 and to an input terminal of a standard operational amplifier 120 via a resistor/capacitor network, consisting of a series of resistor R2 and a capacitor C1 connected to ground. It is a characteristic of pager receivers that in the quiescent ON state a relatively small amount of current is drawn from the power source and that a significantly greater amount of current is drawn each time the pager receiver generates an output pulse. An indication of the magnitude of the current drawn by the pager receiver may be detected across resistor R1, connected between the negative battery terminal of the pager receiver and ground. Since the negative battery terminal of the pager receiver 110 is connected to one terminal of the operational amplifier 120 via the R2, C1 network, an indication of the voltage drop across R1 and, therefore, an indication of the magnitude of the current drawn by the pager receiver 110, is applied to a first input terminal 121 of the operational amplifier 120. Alternative arrangements may be used for measuring the magnitude of current flow in the pager receiver. For example, the pager receiver may have its own battery and the voltage drop across the battery, due to its internal resistance, may be measured. Alternatively, the voltage drop across a resistor in series with the battery may be used to provide an indication of the magnitude of current drawn by the pager receiver.

A second input terminal 122 of operational amplifier 120 is connected to a voltage supply Vcc through a resistor R4 and is connected to ground through a resistor R3. Operational amplifier 120 and other operational amplifiers used in this circuit are well known devices, having non-inverting (+) and inverting (−) input terminals and generating an output current when the voltage value of the non-inverting (+) terminal is greater than that of the inverting (−) terminal. The values of R3 and R4 are chosen such that the voltage on input terminal 122 lies between the voltage level of input terminal 121 when the pager receiver is not generating an output pulse and the voltage level of terminal 121 when the pager receiver 110 is generating an output pulse. The R-C network of resistor R2 and capacitor C1 is provided as a noise trapping circuit and its component values are selected accordingly. The output of the amplifier 120 is connected to the clock input C of a dual data flip-flop 125. The flip-flop 125 has true and compliment outputs, Q and $\overline{Q}$, respectively. The Q and $\overline{Q}$ outputs are connected to dual AND gates 130 and 131. Each of these gates has the other input connected to the output of the operational amplifier 120. The $\overline{Q}$ output of the flip-flop 125 is also connected to its Data input such that the state of the $\overline{Q}$ output is gated to the Q output each time a pulse occurs on the clock input C of the flip-flop 125. Thus, the state of the flip-flop is changed with each pulse generated by the amplifier 120.

The output of the AND gate 130 is connected via a diode 135 and a resistor R8 to a capacitor C4. In a similar fashion, the output of the AND gate 131 is connected through a diode 136 and resistor R9 to a capacitor C5. Both capacitor C4 and C5 have one side connected to ground and form an integrating circuit. When the pager receiver 110 receives an input signal causing it to generate an output tone, the voltage drop across a resistor R1 is increased and the level of terminal 121 of operational amplifier 120 rises above that of its fixed value input terminal 122, causing a positive output pulse to be generated. Since one of the output terminals Q and $\overline{Q}$ of flip-flop 125 is in a high state whenever this pulse occurs, one of the AND gates 130, 131 will be activated causing a current to flow to one or the other of the R-C combinations of R8, C4 and R9, C5. In this manner, alternately occurring pulses generated by the pager receiver 110 cause the capacitors C4 and C5 to be charged in an alternating fashion. Other integrating circuits, such as a single capacitor which is alternately charged and discharged or a digital up-down counter, may also be used.

The pager 110 typically generate bursts of pulses of a first type and pulses of a second type, respectively, in response to different first and second signals from the pager communication system. The pulse types commonly differ in duration of the individual pulse signals for each type. For example, pulses of a burst of pulses of the first type may all be of the same duration whereas the pulses of a burst of pulses of the second type may be alternating short and long pulses. The bursts of pulses are not unlike a series of dashes for one pulse type and a series of dot-dash pulses, as in Morse code, for pulses of the other type. Commercially available pager receivers will typically generate an even number of pulse pairs in each pulse burst, independent of whether the burst consists of pulses of all the same duration or pulses of different durations. It will be apparent that in the circuit of this invention the capacitors C4 and C5 will be charged to the same voltage level if an even number of pulses of equal duration are generated by the pager receiver 110. Similarly, the charge on the capacitor C4 and C5 will differ after an even number of alternating short and long duration pulses has been received. If the number of pulses in a burst of pulses generated by the pager receiver is not an even number, a counting or timing circuit may be devised such that the charging of the capacitors is terminated after a selected even number of pulses has been received.

The capacitors C4 and C5 are connected to a comparator network consisting of operational amplifiers 140, 141 and 142, each having a first and a second input. The amplifier 140 has its first input connected to the positive side of the capacitor C4. The second input of amplifier 141 and the first input of amplifier 142 are connected to the positive side of the capacitor C5. The first input of the amplifies 141 is connected to the output terminal of amplifier 140. The second input terminal of amplifier 140 is connected to its output via a feedback resistor R12. The second input of amplifier 140 is also connected to the second input of amplifier 142 through a resistor R10. A resistor R11 connects the second input of amplifier 141 to ground. The values of the resistors are R10, R11 and R12 are selected such that the output of amplifier 140, connected to the first input of amplifier 141, is higher than the voltage corresponding to the charge on C4, and such that the second input of amplifier 142, connected to the output of amplifier 140 via the series connected resistors R10 and R12, is lower than the voltage on the capacitor C4. In this manner, a voltage range is established. When the voltage on the capacitor C5 is substantially equal to the voltage on the capacitor C4, i.e. falls within the range deferred by the inputs to amplifiers 141 and 142, both amplifiers 141 and 142 are activated to produce a high output voltage. The outputs of amplifiers 141 and 142 are connected via a diode AND gate comprising diodes 180 and 181 and a load resistor 183 connected to a standard voltage source. When both amplifiers 141 and 142 provide a high output signal, the diode AND gate, which is directly connected to an input terminal of AND gate 161 and connected via an invertor 185 to an input terminal of AND gate 160, will provide a high output signal. When the voltage on the capacitor C4 and C5 differ significantly in value, one of the operational amplifiers 141, 142 will provide a low output signal causing the diode AND gate consisting of diodes 180, 181 to provide a low output signal.

The output of operational amplifier 120 is connected via an invertor 151 to a timer circuit 150. The timer circuit is responsive to a low going input signal to provide a high output signal for a selected period of time. The timer may be set for a period which is somewhat greater in duration than the normal duration of a burst of pulses from the pager receiver 110. During this time period, the output 152 of the timer 150 has a high voltage value and after completion of the time period returns to a low, near ground value. An invertor 155 connects the output of the timer to one side of a capacitor C3. The other side of the capacitor C3 is directly connected to inputs of AND gates 160, 161 via control lead 157 and is connected to ground via resistor R7. When the output of the timer 150 changes from a high logical voltage value to a low value, the invertor output connected to the capacitor C3 changes from a low voltage value to a high voltage value providing a short duration pulse on control lead 157. The duration of the pulse is determined by the time constant of capacitor C3 and resistor R7. The outputs of AND gates 160, 161 are connected to a reset coil 163 and a set coil 164, respectively of a bi-stable latching relay 170. The states of the diode AND gate comprising diodes 180, 181 are applied to the reset and set coils 163, 164 via the AND gates 160, 161 in coincidence with the pulse on control lead 157. In this manner, the relay 170 is selectively operated between its two stable positions in response to burst of pulses generated by the pager receiver 100 and stored in an alternating fashion on capacitors C4 and C5.

The capacitors C4, C5 are connected via diodes 144, 145, respectively, to a discharge resistor R6, which has one end connected to output conductor 152 of the timer 150. As mentioned earlier, the conductor 152 is at a low level when the timer is in the non-activated state allowing the capacitors C4 and C5 to discharge through the resistor R6. The value of the resistor R6 is selected to allow for a relatively slow discharge and to assure that the capacitors are not discharged significantly before the end of the control pulse 157. A diode 169 connected between the control lead 157 and ground is provided to allow for a relatively quick charge of the capacitor C3 when the timer is first activated and the output of the invertor 155 goes to a low logic value. A leakage resistor R5 is connected between the capacitors to allow the capacitors to discharge to the same level over time, even if the diodes have different forward voltage thresholds.

What is claim is:

1. A pager operated control circuit for use with a pager receiver generating bursts of pulses of a first type and bursts of pulses of a second type and comprising power terminals for connection to a power supply, the control circuit comprising:

an input terminal connectable to a power terminal of the pager receiver;

a detector circuit responsive to current flow in the pager receiver to generate a first detector output signal when pulses of the first type are generated by the pager receiver and to generate a second detector output signal when pulses of the second type are generated by the pager receiver; and a two state output device responsive to the first and second detector output signals to selectively assume first and second output states;

the detector comprising first and second capacitors and a charge control circuit for alternately charging the first and second capacitors in response to sequentially occurring pulses of a burst of pulses generated by the pager receiver and output circuitry responsive to electrical charge on the capacitors to generate the detector output signals;

the charge control circuit comprising an input circuit connected to the input terminal and responsive to a current flow in the pager receiver of a magnitude greater than a predetermined magnitude, indicative of the generation of pulses by the pager receiver, to generate an input control signal and circuitry responsive to the input control signal to alternately charge the first and second capacitors;

the charge control circuit further comprising a flip-flop circuit having an input terminal connected to the input circuit and first and second output terminals and wherein the charge control circuit further comprises a first gating circuit connected to the input circuit and to the first flip-flop output terminal and a second gating circuit connected to the input circuit and to the second flip-flop output terminal, the first and second gating circuits responsive to the input control signal and the state of the flip-flop to alternately charge the first and second capacitors, respectively.

2. A pager operated control circuit for use with a pager receiver generating bursts of pulses of a first type and bursts of pulses of a second type and comprising power terminals for connection to a power supply, the control circuit comprising:

an input terminal connectable to a power terminal of the pager receiver;

a detector circuit responsive to current flow in the pager receiver to generate a first detector output signal when pulses of the first type are generated by the pager receiver and to generate a second detector output signal when pulses of the second type are generated by the pager receiver, the detector comprising first and second capacitors and a charge control circuit for alternately charging the first and second capacitors in response to sequentially occurring pulses of a burst of pulses generated by the pager receiver and output circuitry responsive to electrical charge on the capacitors to generate the detector output signals, the charge control circuit comprising an input circuit connected to the input terminal and responsive to a current flow in the pager receiver of a magnitude greater than a predetermined magnitude, indicative of the generation of pulses by the pager receiver, to generate an input control signal and circuitry responsive to the input control signal to alternately charge the first and second capacitors, the detector circuit comprising comparator circuitry connected to the capacitors and responsive to signals corresponding to charges on the first and second capacitors to selectively generate the first and second detector output signals, the comparator circuitry comprising circuitry connected to the first and second capacitors and generating a first threshold signal having a magnitude greater than a voltage level corresponding to the charge on one of the capacitors and a second threshold signal having a magnitude less than the voltage level corresponding to the charge on one of the capacitors and output circuitry for generating the first detector output signal when the voltage level corresponding to the charge on the other of the capacitors falls within a range defined between the magnitude of the first threshold signal and the magnitude of the second threshold signal and generating the second detector output signal when the voltage level corresponding to the charge on the other of the capacitors falls outside the range, and a two state output device responsive to the first and second detector output signals to selectively assume first and second output states.

3. The control circuit in accordance with claims 2 wherein the two state output device comprises a bistable latching relay.

4. A pager operated control circuit for use with a pager receiver generating bursts of pulses of a first type and bursts of pulses of a second type and comprising power terminals for connection to a power supply, the control circuit comprising:

an input terminal connectable to a power terminal of the pager receiver;

a detector circuit responsive to current flow in the pager receiver to generate a first detector output signal when pulses of the first type are generated by the pager receiver and to generate a second detector output signal when pulses of the second type are generated by the pager receiver, the detector circuit comprising an integrating circuit for storing an indication of pulses of the first type and pulses of the second type generated by the pager receiver and circuitry responsive to the stored indication of pulses of the first type and pulses of the second type to generate the detector output signals; and a two state output device responsive to the first and second detector output signals to selectively assume first and second output states.

5. A pager operated control circuit for use with a pager receiver generating bursts of pulses of a first type and bursts of pulses of a second type, the pulses of bursts of pulses of the first type being of equal duration and pulses of bursts of pulses of the second type being of unequal duration, the pager operated control circuit comprising power terminals for connection to a power supply, the control circuit comprising:

an input terminal connectable to a power terminal of the pager receiver;

a detector circuit responsive to current flow in the pager receiver to generate a first detector output signal when pulses of the first type are generated by the pager receiver and to generate a second detector output signal when pulses of the second type are generated by the pager receiver;

the detector circuit comprising first and second capacitors and a charge control circuit for alternately charging the first and second capacitors in response to sequentially occurring pulses of a burst of pulses generated by the pager receiver and output circuitry responsive to electrical charge on the capacitors to generate the detector output signals; and a two state output device responsive to the first and second detector output signals to selectively assume first and second output states.

6. The control circuit in accordance with claim 5 wherein the charge control circuit comprises an input circuit connected to the input terminal and responsive to a current flow in the pager receiver of a magnitude greater than a predetermined magnitude, indicative of the generation of pulses by the pager receiver, to generate an input control signal and circuitry responsive to the input control signal to alternately charge the first and second capacitors.

* * * * *